US011687392B2

(12) United States Patent
Shu et al.

(10) Patent No.: US 11,687,392 B2
(45) Date of Patent: Jun. 27, 2023

(54) METHOD AND SYSTEM FOR CONSTRUCTING PERSISTENT MEMORY INDEX IN NON-UNIFORM MEMORY ACCESS ARCHITECTURE

(71) Applicant: Tsinghua University, Beijing (CN)

(72) Inventors: Jiwu Shu, Beijing (CN); Qing Wang, Beijing (CN); Youyou Lu, Beijing (CN); Zhuo Cheng, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 105 days.

(21) Appl. No.: 17/534,121

(22) Filed: Nov. 23, 2021

(65) Prior Publication Data

US 2022/0413952 A1   Dec. 29, 2022

(30) Foreign Application Priority Data

Jun. 28, 2021   (CN) .......................... 202110722046.4

(51) Int. Cl.
*G06F 16/23*    (2019.01)
*G06F 16/901*   (2019.01)
*G06F 11/07*    (2006.01)
*G06F 9/30*     (2018.01)
*G06F 11/14*    (2006.01)
*G06F 12/02*    (2006.01)

(52) U.S. Cl.
CPC .......... *G06F 11/073* (2013.01); *G06F 9/3009* (2013.01); *G06F 11/0772* (2013.01); *G06F 11/1438* (2013.01); *G06F 12/0238* (2013.01); *G06F 16/2365* (2019.01); *G06F 2212/2542* (2013.01); *Y10S 707/99953* (2013.01)

(58) Field of Classification Search
CPC ......... G06F 16/2365; G06F 2212/2542; G06F 16/901; G06F 16/2228; Y10S 707/99953
USPC ....................................................... 707/687
See application file for complete search history.

(56) References Cited

U.S. PATENT DOCUMENTS

| | | | |
|---|---|---|---|
| 10,599,485 B2 * | 3/2020 | Levandoski | G06F 9/52 |
| 10,956,324 B1 * | 3/2021 | Giles | G06F 12/128 |
| 2015/0355981 A1 * | 12/2015 | Booss | G06F 16/24561 |
| | | | 707/674 |
| 2016/0283498 A1 * | 9/2016 | Beaverson | G06F 16/9017 |
| 2018/0260324 A1 * | 9/2018 | Marathe | G06F 12/0804 |

(Continued)

*Primary Examiner* — Kuen S Lu
(74) *Attorney, Agent, or Firm* — Hodgson Russ LLP

(57) ABSTRACT

A method for constructing a persistent memory index in a non-uniform memory access architecture includes: maintaining partial persistent views in a persistent memory and maintaining a global volatile view in a DRAM; an underlying persistent memory index processing a request in a foreground thread when cold data is accessed; when hot data is accessed, reading a key-value pair for a piece of hot data in the global volatile view in response to a query operation carried in the request, and in response to an insert/update/delete operation carried in the request, updating a local partial persistent view and the global volatile view; and in response to a hotspot migration, a background thread generating new partial persistent views and a new global volatile view, and recycling the partial persistent views and the global volatile view for old hot data into the underlying persistent memory index.

20 Claims, 3 Drawing Sheets

(56) References Cited

U.S. PATENT DOCUMENTS

2019/0235933 A1\* 8/2019 Levandoski ........ G06F 9/30043
2021/0019527 A1\* 1/2021 Zhang ................... G06V 10/44

\* cited by examiner (a) a variable value (b) a value with a 8-byte fixed length

METHOD AND SYSTEM FOR CONSTRUCTING PERSISTENT MEMORY INDEX IN NON-UNIFORM MEMORY ACCESS ARCHITECTURE

CROSS-REFERENCE TO RELATED APPLICATION

This application claims priority to Chinese Patent Application No. 202110722046.4, filed on Jun. 28, 2021, the entire content of which is incorporated by reference herein.

FIELD

The disclosure relates to the technical field of non-volatile storage, and more particularly to a method for constructing a persistent memory index in a non-uniform memory access architecture.

BACKGROUND

As the number of cores and the number of DIMM (dual inline memory module) slots for a single CPU are limited, most servers have a non-uniform memory access (NUMA) architecture in order to support larger-scale systems. There are multiple NUMA nodes in the servers with the NUMA architecture. Each NUMA node has a CPU, a persistent memory, and a DRAM locally. The NUMA nodes are connected via a dedicated bus. Compared to accessing the persistent memory and the DRAM of other NUMA node, the CPU accesses the persistent memory and the DRAM locally with lower latency and higher bandwidth.

The persistent memory may store data persistently like a disk. In addition, the persistent memory is directly accessed by the CPU through store and load instructions when it is installed on the memory bus. Therefore, the persistent memory has the advantages of low latency and high bandwidth. The persistent memory index is an index built in the persistent memory, which maintains a key-to-value mapping and guarantees that the insert, update, and delete operations have crash consistency. The crash consistency refers to a situation where a system may restore to a consistent state after it crashes and restarts, and the operations successfully submitted must be viewed.

SUMMARY

According to a first aspect of the disclosure, a method for constructing a persistent memory index in a non-uniform memory access (NUMA) architecture, in which the NUMA architecture includes a plurality of NUMA nodes having a persistent memory and a DRAM. The method includes: maintaining a plurality of partial persistent views in the persistent memory, and maintaining a global volatile view in the DRAM; processing by an underlying persistent memory index, a request in a foreground thread when cold data is accessed by the foreground thread; when hot data is accessed by the foreground thread, in response to a query operation carried in the request, reading by the foreground thread a key-value pair corresponding to a piece of hot data in the global volatile view, and in response to an insert, update or delete operation carried in the request, updating by the foreground thread a local partial persistent view of a NUMA node where the foreground thread is located and the global volatile view; and in response to a hotspot migration, generating by a background thread new partial persistent views and a new global volatile view based on new hot data, and recycling the partial persistent views and the global volatile view for old hot data into the underlying persistent memory index.

According to a second aspect of the disclosure, a system for constructing a persistent memory index is in a non-uniform memory access (NUMA) architecture. The NUMA architecture includes a plurality of NUMA nodes. The system includes a DRAM configured to maintain a global volatile view shared by the plurality of NUMA nodes; a persistent memory configured to maintain a partial persistent view on each NUMA node and store an underlying persistent memory index for the plurality of NUMA nodes; and a plurality of CPU cores. When cold data is accessed via a foreground thread, the underlying persistent memory index is configured to process a request in the foreground thread. When hot data is accessed via the foreground thread, the plurality of CPU cores are configured to: read a key-value pair corresponding to a piece of hot data in the global volatile view in response to a query operation carried in the request; and update a local partial persistent view of a NUMA node where the foreground thread is located and the global volatile view in response to an insert, update or delete operation carried in the request. In response to a hotspot migration, the plurality of CPU cores are configured to: generate new partial persistent views and a new global volatile view based on new hot data via a background thread, and recycle the partial persistent views and the global volatile view for old hot data into the underlying persistent memory index via the background thread.

The additional aspects and advantages of the present disclosure will be partially given in the following description, and some will become obvious from the following description, or be understood through the practice of the present disclosure.

BRIEF DESCRIPTION OF THE DRAWINGS

The above and/or additional aspects and advantages of the present disclosure will become obvious and easy to understand from the following description of the embodiments in conjunction with the accompanying drawings.

DETAILED DESCRIPTION

The embodiments of the application are described in detail above, and specific examples are used in this article to illustrate the principles and implementation of the application. The descriptions of the above examples are only used to help understand the methods and core concept of the application; at the same time, those skilled in the art will make changes to the specific implementation and the scope of application based on the concept of the present application. In summary, the content of the specification should not be construed as limiting the application.

In the related art, the existing index construction method under the NUMA architecture is applied for volatile indexes stored in the DRAM, while there is no method for constructing the persistent memory indexes. In the existing index construction method, an index copy is maintained in each NUMA node and the state of the index copy among different NUMA nodes is synchronized based on the operation log. When the existing methods are applied for the persistent memory indexes, three problems may be generated. Firstly, the crash consistency cannot be guaranteed. Secondly, the persistent memory space may be occupied exponentially since there is a copy on each NUMA node. Thirdly, the write bandwidth of the persistent memory may be occupied exponentially since each operation needs to be executed on each copy, while the write bandwidth of the persistent memory is very limited, having only one-sixth of the DRAM.

In order to overcome the above problems, the disclosure provides a method for constructing a persistent memory index in a non-uniform memory access (NUMA) architecture. In other words, with the method in the disclosure, the technical problems may be solved that the space and the write bandwidth of the persistent memory may be consumed exponentially and the crash consistency cannot be guaranteed when the existing methods are applied for the persistent memory indexes, remote access of the persistent memory under the NUMA architecture may be effectively reduced and the performance of persistent memory indexes is thus improved. As only a small amount of additional persistent memory and DRAM are needed to process hot data, additional recovery time after the server crashes and restarts is minimized.

Figure 1:
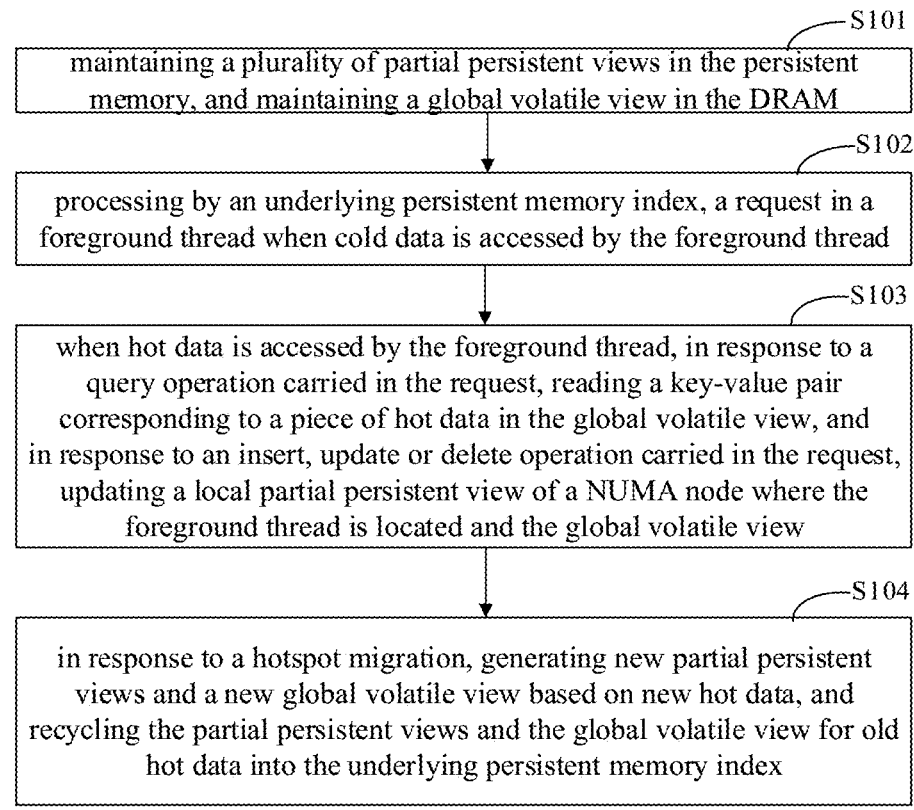
FIG. 1 is a flowchart of a method for constructing a persistent memory index in a NUMA architecture according to an embodiment of the present disclosure.

FIG. 1 is a flowchart of a method for constructing a persistent memory index in a non-uniform memory access architecture according to an embodiment of the present disclosure. The method for constructing a persistent memory index under the NUMA architecture is transparent to upper-layer applications and provides common interfaces for the persistent memory indexes, including query, update, insert, and delete interfaces. As shown in FIG. 1, the method includes actions at blocks S101-S104.

At S101, a plurality of partial persistent views are maintained in the persistent memory, and a global volatile view is maintained in the DRAM.

At S102, an underlying persistent memory index processes a request in a foreground thread when cold data is accessed by the foreground thread.

At S103, when hot data is accessed by the foreground thread, the foreground thread reads a key-value pair corresponding to a piece of hot data in the global volatile view in response to a query operation carried in the request, and updates a local partial persistent view of a NUMA node where the foreground thread is located and the global volatile view in response to an insert, update or delete operation carried in the request.

At S104, in response to a hotspot migration, a background thread generates new partial persistent views and a new global volatile view based on new hot data, and recycles the partial persistent views and the global volatile view for old hot data into the underlying persistent memory index.

With the above method, the plurality of partial persistent views are maintained in the persistent memory, and the global volatile view is maintained in the DRAM; when the cold data is accessed, the underlying persistent memory index for the NUMA nodes processes a request in the foreground thread; when the hot data is accessed, the foreground thread reads the key-value pair in the global volatile view in response to the query operation, and updates the local partial persistent view of the NUMA node where the foreground thread is located and the global volatile view in response to an insert, update or delete operation; when a hotspot migration occurs, the background thread generates new partial persistent views and a new global volatile view based on new hot data, and recycles the partial persistent views and the global volatile view for old hot data into the underlying persistent memory index. As a result, the technical problems may be solved that the space and the write bandwidth of the persistent memory may be consumed exponentially and the crash consistency cannot be guaranteed when the existing methods are applied for the persistent memory indexes, remote access of the persistent memory under the NUMA architecture may be effectively reduced and the performance of persistent memory indexes is thus improved. As only a small amount of additional persistent memory and DRAM are needed to process hot data, additional recovery time after the server crashes and restarts is minimized.

In an embodiment of the disclosure, the NUMA architecture includes a plurality of NUMA nodes, each of which includes a persistent memory and shares a DRAM.

In an embodiment of the disclosure, data is distinguished to cold data and hot data according to an access frequency of keys corresponding to the data. The data belongs to the hot data when the access frequency of keys corresponding to the data is greater than a set threshold, and the data belongs to the cold data when the access frequency of keys corresponding to the data is less than the set threshold.

In an embodiment of the disclosure, there are a plurality of partial persistent views, and each NUMA node has a partial persistent view. The local partial persistent view refers to a partial persistent view of a NUMA node where the current thread accessing the data is located. The persistent memory space occupied by the partial persistent view is managed by a special persistent memory allocator, and a transaction mechanism is used to avoid persistent memory leaks during the allocation process.

In an embodiment of the disclosure, key-value pairs corresponding to pieces of the hot data are stored in the partial persistent views, and additional metadata is recorded in the partial persistent views, so as to ensure that the latest data may be restored from multiple partial persistent views after the system crashes and restarts. The additional metadata includes a 64-bit monotonically increasing version, in which the highest bit is a deleted bit. For each piece of hot data, its current version value is stored in the DRAM. Each time the partial persistent view is updated, the corresponding version needs to be incremented by 1 and be written into the partial persistent view together with the value for each piece of hot data. If it is a delete operation, the highest bit of the version is set to 1. Therefore, the system can find the most recently submitted value (i.e., the latest value) after it crashes and restarts by comparing the versions in different partial persistent views.

In an embodiment of the disclosure, for each piece of hot data, a corresponding key-value pair, a readers-writer lock, and location information of the key-value pair in the partial persistent view are recorded in the global volatile view. The readers-writer lock is used to ensure the correctness of concurrent access.

The global volatile view is organized into a high-speed DRAM index. Due to the extremely high bandwidth and low latency of the DRAM, the global volatile view may provide high access performance.

In an embodiment of the disclosure, the underlying persistent memory index is any existing persistent index that supports the concurrent access. The underlying persistent memory index is stored in the persistent memory. The underlying persistent memory index can use various concurrency control methods, such as lock-based and lock-free. The underlying persistent memory index can use various data structures, such as hash tables and B-trees.

In an embodiment of the disclosure, the query operation for the hot data includes that, the thread queries the global volatile view to fetch a read lock of a key-value pair corresponding to a piece of hot data and read the key-value pair, and releases the read lock.

In an embodiment of the disclosure, the insert, update or delete operation for the hot data includes that, the thread queries the global volatile view to fetch a write lock of a key-value pair corresponding to a piece of hot data and read location information of the key-value pair in the local partial persistent view, writes the latest value into the local partial persistent view according to the location information and updates the key-value pair in the global volatile view to the latest value, and releases the write lock.

The process of writing {value, version} to the local partial persistent view needs to ensure the crash consistency. The partial persistent view is organized into an array, where each element records a {value, version} for a piece of hot data. There are two element formats.

When the value is variable, this element is a 64-bit pointer which points to {value, version}. Copy-on-write is used by the thread to ensure the crash consistency. In particular, the thread first allocates a persistent memory space to write and persist the {value, version} into the persistent memory space; the thread then points and persists the pointer to the persistent memory space.

When the value has a fixed length with 8 bytes, the element includes a 1-byte indicator and two 16-byte tuples, i.e., {value 0, version 0} and {value 1, version 1}. The indicator points to a valid data location. The address of each element is aligned to the size (64 bytes) of a cache line. When the thread wants to write a new tuple {value, version}, an invalid data location is searched according to the indicator, and the new tuple is written at the invalid data location; the thread then updates the indicator to point to the newly-written {value, version}; and finally, the thread calls a CPU instruction to persist the element.

In an embodiment of the disclosure, when the hotspot is migrated (i.e., there is new hot data), the specific process of performing background operations includes: generating by a background thread new partial persistent views and a new global volatile view based on the new hot data; installing by the background thread the new local persistent views and the new global volatile view into the system for use of subsequent operation requests; inserting by the background thread the key-value pairs for old hot data in the old global volatile view into the underlying persistent memory index, and releasing the persistent memory space occupied by the old partial persistent views and the DRAM space occupied by the old global volatile view.

The background thread detects changes in hotspots in real time, and each foreground thread has a record buffer area, where the keys accessed by the foreground thread are written in real time. The background thread maintains a count-min sketch and a minimum heap, in which the count-min sketch is used to estimate an access frequency of a certain key, and the minimum heap is used to maintain a set of keys corresponding to the latest hot data. The background thread continuously reads the records in the record buffer and updates the count-the count-min sketch and the minimum heap. When the set of keys in the minimum heap is significantly different from the set of keys in the current global volatile view, the background thread triggers an update to the global volatile view.

Figure 2:
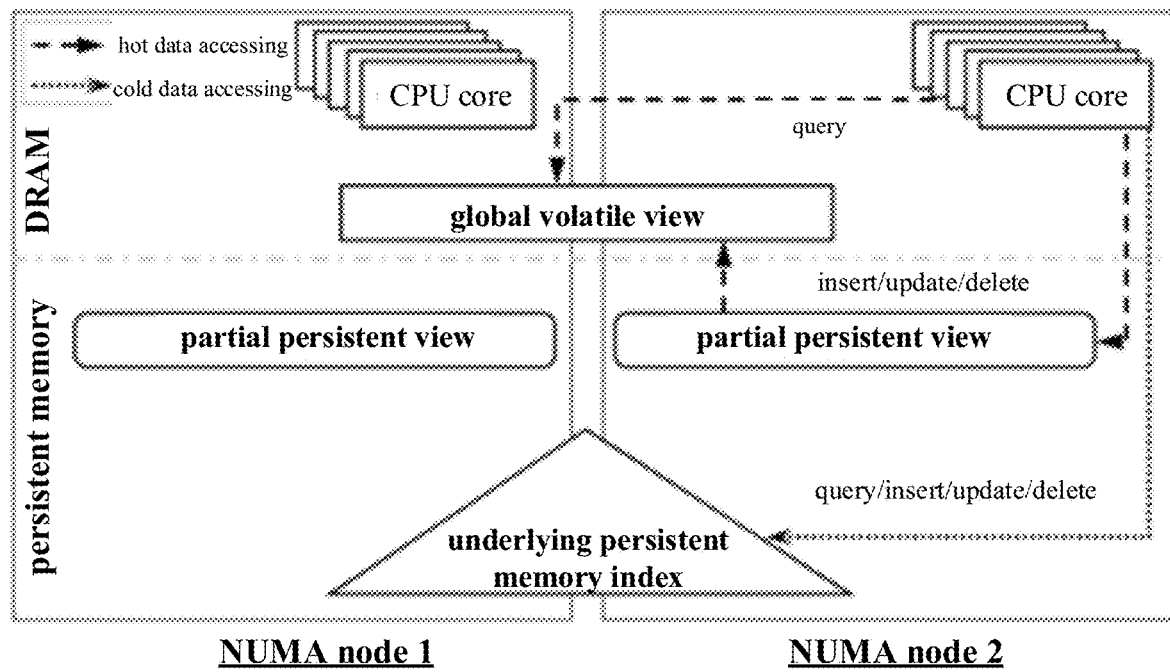
FIG. 2 is a schematic diagram of a persistent memory index in a method for constructing a persistent memory index in a NUMA architecture according to an embodiment of the disclosure.

FIG. 2 is a schematic diagram of a persistent memory index in a method for constructing a persistent memory index in a non-uniform memory access architecture according to an embodiment of the disclosure.

As shown in FIG. 2, the NUMA architecture includes a plurality of NUMA nodes. A part of the DRAM and a part of the persistent memory is allocated for each NUMA node. A plurality of partial persistent views are maintained in the persistent memory and a global volatile view is maintained in the DRAM. For each NUMA node, a local partial persistent view is maintained in the corresponding part of the persistent memory. When cold data is accessed by the thread, requests in the thread are processed by the underlying persistent memory index. When hot data is accessed by the thread, the thread reads information corresponding to the hot data in the global volatile view if the requests include a query operation, and the thread updates the local partial persistent view where the thread is located and the global volatile view if the requests include insert, update or delete operation.

Figure 3:
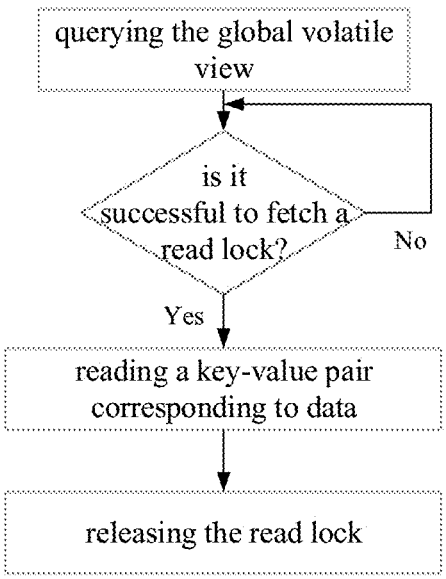
FIG. 3 is a flowchart of a query operation for hot data in a method for constructing a persistent memory index in a NUMA architecture according to an embodiment of the disclosure.

FIG. 3 is a flowchart of a query operation for hot data in a method for constructing a persistent memory index in a non-uniform memory access architecture according to an embodiment of the disclosure.

As shown in FIG. 3, the query operation for hot data according to the embodiment of the disclosure includes: querying by the thread the global volatile view to fetch a read lock of a key-value pair corresponding to a piece of hot data and read the key-value pair; and releasing the read lock.

Figure 4:
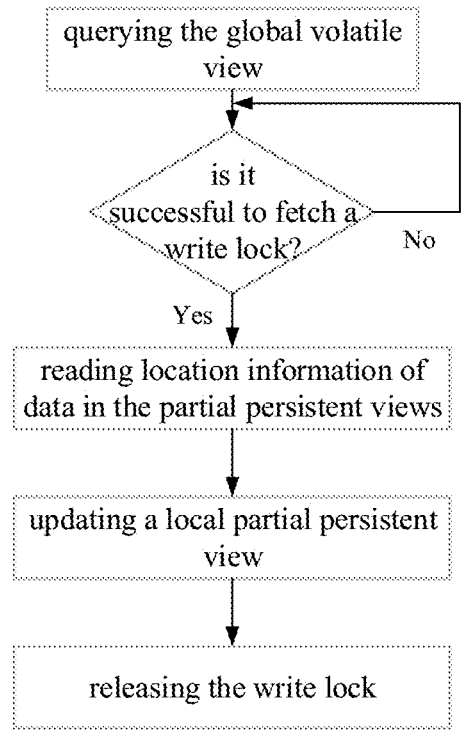
FIG. 4 is a flowchart of insert/update/delete operations for hot data in a method for constructing a persistent memory index in a NUMA architecture according to an embodiment of the disclosure.

FIG. 4 is a flowchart of an insert/update/delete operation for hot data in a method for constructing a persistent memory index in a non-uniform memory access architecture according to an embodiment of the disclosure.

As shown in FIG. 4, the insert/update/delete operation for the hot data according to the embodiment of the disclosure includes: querying by the thread the global volatile view to fetch a write lock of a key-value pair corresponding to a piece of hot data and read location information of the key-value pair in the local partial persistent view; writing by the thread the latest value into the local partial persistent view according to the location information; updating the key-value pair in the global volatile view to the latest value, and releasing the write lock.

Figure 5:
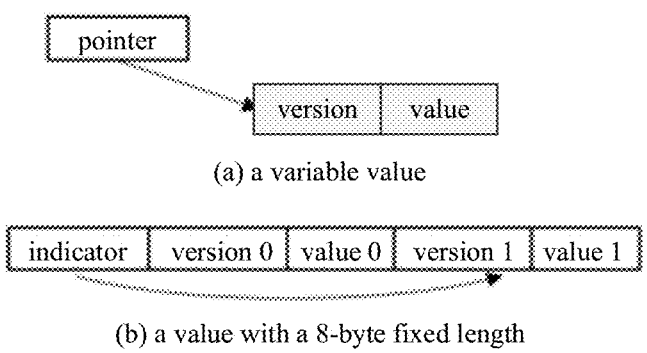
FIG. 5 is a schematic diagram of data management formats in a partial persistent view of a method for constructing a persistent memory index in a NUMA architecture according to an embodiment of the disclosure.

FIG. 5 is a schematic diagram of data management formats in a partial persistent view of a method for constructing a persistent memory index in a non-uniform memory access architecture according to an embodiment of the disclosure.

As shown in FIG. 5, the partial persistent view is organized into an array. Each element of the array records a value and a version for a piece of hot data. There are two element formats shown in FIG. 5.

When the value is variable, this element is a 64-bit pointer which points to {value, version} and copy-on-write is used by the thread to ensure the crash consistency. In particular, the thread first allocates a persistent memory space to write and persist the {value, version} into the persistent memory space; the thread then points and persists the pointer to the persistent memory space.

When the value has a fixed length with 8 bytes, the element includes a 1-byte indicator and two 16-byte tuples, i.e., {value 0, version 0} and {value 1, version 1}. The indicator points to a valid data location. The address of each element is aligned to the size (64 bytes) of a cache line. When the thread wants to write a new tuple {value, version}, an invalid data location is searched according to the indicator, and the new tuple is written at the invalid data location; the thread then updates the indicator to point to the newly-written {value, version}; and finally, the thread calls a CPU instruction to persist the element.

Figure 6:
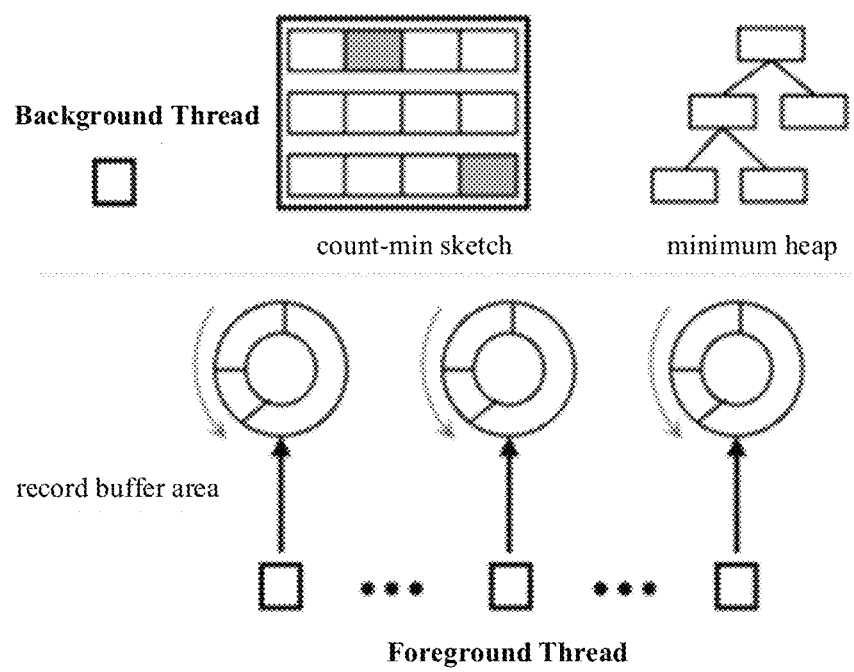
FIG. 6 is a schematic diagram of detecting hotspots in a method for constructing a persistent memory index in a NUMA architecture according to an embodiment of the disclosure.

FIG. 6 is a schematic diagram of detecting hotspots in a method for constructing a persistent memory index in a non-uniform memory access architecture according to an embodiment of the disclosure.

As shown in FIG. 6, when a background thread detects the hotspots in real time in the method for constructing a persistent memory index in a non-uniform memory access architecture, each of the foreground threads has a record buffer area, where the keys accessed by the foreground thread are written in real time. The background thread maintains a count-min sketch and a minimum heap, in which the count-min sketch is used to estimate an access frequency of a certain key, and the minimum heap is used to maintain a set of keys corresponding to the latest hot data. The background thread continuously reads the records in the record buffer area and updates the count-min sketch and the minimum heap. When the set of keys in the minimum heap is significantly different from the set of keys in the current global volatile view, the background thread triggers an update to the global volatile view.

In the description of this specification, descriptions with reference to the terms "one embodiment", "some embodiments", "examples", "specific examples", or "some examples" etc. mean specific features, structures, materials, or characteristics described in conjunction with the embodiment or example are included in at least one embodiment or example of the disclosure. In this specification, schematic representations of the above terms do not necessarily refer to the same embodiment or example. Moreover, the described specific features, structures, materials or characteristics can be combined in any one or more embodiments or examples in a suitable manner. In addition, those skilled in the art can bind and combine the different embodiments or examples and the features of the different embodiments or examples described in this specification without contradicting each other.

In addition, the terms "first" and "second" are only used for the purposes of description, and cannot be understood as indicating or implying relative importance or implicitly indicating a number of indicated technical features. Therefore, the features defined by "first" and "second" may explicitly or implicitly include at least one of the features. In the description of the disclosure, "a plurality of . . . " means at least two . . . , such as two, three, etc., unless specifically defined otherwise.

Any process or method description in the flowchart or described otherwise herein may be understood as modules, segments or portions of one or more codes that includes executable instructions for implementing custom logic functions or steps of the process, and the scope of the preferred embodiments of the present disclosure includes additional implementations, which may perform functions without in the order shown or discussed, including a substantially simultaneous manner or in the reverse order according to the functions involved. This should be understood by those skilled in the art to which the embodiments of the present disclosure belong.

The logic and/or steps represented in the flowchart or described otherwise herein, for example, may be considered as a sequenced list of executable instructions for implementing logic functions, and may be embodied in any computer-readable medium for use of instruction execution systems, apparatuses or devices (such as computer-based systems, systems including processors, or other systems that may obtain and execute instructions from the instruction execution systems, apparatuses or devices), or for use in combination with these instruction execution systems, apparatuses or devices. For the purposes of this specification, a "computer-readable medium" may be any apparatus that may contain, store, communicate, propagate, or transmit programs for use of the instruction execution systems, apparatuses, or devices or for use in combination with the instruction execution systems, apparatuses, or devices. More specific examples (non-exhaustive list) of computer-readable media include: electrical connections (electronic devices) with one or more wiring, portable computer disk cases (magnetic devices), a random access memory (RAM), a read-only memory (ROM), an erasable and editable read-only memory (EPROM) or a flash memory, fiber optic devices, and a portable compact disk read-only memory (CDROM). In addition, the computer-readable medium may even be paper or other suitable medium on which the programs can be printed, because the paper or other medium may be for example, optically scanned to obtain the programs electronically by editing, interpreting, processing in other suitable ways if necessary and then store the programs in the computer memory.

It should be understood that each part of the disclosure may be implemented in hardware, software, firmware, or a combination thereof. In the above embodiments, multiple steps or methods may be implemented in software or firmware which is stored in a memory and executed by suitable instruction execution systems. For example, if it is implemented by hardware as in another embodiment, it can be implemented by any one of or a combination of the following technologies known in the art: discrete logic gate circuits for implementing logic functions on data signals, application specific integrated circuits with suitable combinational logic gate circuits, a programmable gate array (PGA), a field programmable gate array (FPGA), etc.

Those skilled in the art may understand that all or part of the steps carried in the method of the foregoing embodiments can be implemented by the programs instructing relevant hardware to complete. The programs can be stored in a computer-readable storage medium. When the programs are executed, one of the steps or their combination of the method embodiment is implemented.

In addition, each functional unit in each embodiment of the present disclosure may be integrated into one processing module, or each unit may exist alone physically, or two or more units may be integrated into one module. The above-mentioned integrated modules may be implemented in the form of hardware or software functional modules. If the integrated module is implemented in the form of software function modules and sold or used as an independent product, it may also be stored in a computer readable storage medium.

The aforementioned storage medium may be a read-only memory, a magnetic disk or an optical disk, etc. Although the embodiments of the disclosure have been shown and described above, it can be understood that the above-mentioned embodiments are exemplary and should not be construed as limitations to the disclosure. Those skilled in the art can make changes, modifications, substitutions, and modifications to the above embodiments within the scope of the disclosure.

What is claimed is:

1. A method for constructing a persistent memory index in a non-uniform memory access (NUMA) architecture, wherein the NUMA architecture comprises a plurality of NUMA nodes having a persistent memory and a DRAM, the method comprising:
    maintaining a plurality of partial persistent views in the persistent memory, and maintaining a global volatile view in the DRAM;
    processing by an underlying persistent memory index, a request in a foreground thread when cold data is accessed by the foreground thread;
    when hot data is accessed by the foreground thread,
        in response to a query operation carried in the request, reading by the foreground thread a key-value pair corresponding to a piece of hot data in the global volatile view; and
        in response to an insert, update or delete operation carried in the request, updating by the foreground thread a local partial persistent view of a NUMA node where the foreground thread is located and the global volatile view; and
        in response to a hotspot migration, generating by a background thread new partial persistent views and a new global volatile view based on new hot data, and recycling the partial persistent views and the global volatile view for old hot data into the underlying persistent memory index.

2. The method of claim 1, wherein a persistent memory space of each NUMA node is stored with each partial persistent view, and the global volatile view in the DRAM is shared by the plurality of NUMA nodes.

3. The method of claim 1, wherein an access frequency of keys of the hot data is greater than a set threshold, and the access frequency of keys of the cold data is less than the set threshold.

4. The method of claim 1, wherein each partial persistent view is stored with a key-value pair corresponding to a piece of hot data and additional metadata having a 64-bit monotonically increasing version, in which the version is configured to restore the latest key-value pair among the partial persistent views after a system crashes and restarts.

5. The method of claim 4, wherein each partial persistent view is organized into an array, when the value for the piece of hot data is variable, each element of the array is a 64-bit pointer which points to {value, version} for the piece of hot data and a copy-on-write is employed by the foreground thread to ensure crash consistency.

6. The method of claim 4, wherein each partial persistent view is organized into an array, when the value for the piece of hot data is in a fixed length with 8 bytes, each element of the array comprises a 1-byte indicator pointing to a valid data location and two 16-byte tuples.

7. The method of claim 1, wherein the global volatile view is stored with the key-value pair corresponding to the piece of hot data, a readers-writer lock, and location information of the key-value pair in the partial persistent view, in which the readers-writer lock is configured to ensure the correctness of concurrent access.

8. The method of claim 7, wherein the underlying persistent memory index is configured to support the concurrent access and is stored in the persistent memory for the plurality of NUMA nodes.

9. The method of claim 1, wherein the query operation for the hot data comprises:
    querying by the foreground thread the global volatile view to fetch a read lock of the key-value pair corresponding to the piece of hot data,
    reading by the foreground thread the key-value pair based on the read lock, and
    releasing by the foreground thread the read lock.

10. The method of claim 1, wherein the insert, update or delete operation for the hot data comprises:
    querying by the foreground thread the global volatile view to fetch a write lock of the key-value pair corresponding to the piece of hot data,
    reading by the foreground thread location information of the key-value pair in the partial persistent view,
    writing by the foreground thread the latest value into the local partial persistent view according to the location information,
    updating by the foreground thread the key-value pair in the global volatile view to the latest value, and
    releasing by the foreground thread the write lock.

11. A system for constructing a persistent memory index, wherein the system is in a non-uniform memory access (NUMA) architecture, the NUMA architecture comprising a plurality of NUMA nodes, the system comprising:
    a DRAM, configured to maintain a global volatile view shared by the plurality of NUMA nodes;
    a persistent memory, configured to maintain a partial persistent view on each NUMA node and store an underlying persistent memory index for the plurality of NUMA nodes; and
    a plurality of CPU cores;
    wherein when cold data is accessed via a foreground thread, the underlying persistent memory index is configured to process a request in the foreground thread;
    wherein when hot data is accessed via the foreground thread, the plurality of CPU cores are configured to:
        read a key-value pair corresponding to a piece of hot data in the global volatile view in response to a query operation carried in the request; and
        update a local partial persistent view of a NUMA node where the foreground thread is located and the global volatile view in response to an insert, update or delete operation carried in the request; and
    wherein in response to a hotspot migration, the plurality of CPU cores are configured to: generate new partial persistent views and a new global volatile view based on new hot data via a background thread, and recycle the partial persistent views and the global volatile view for old hot data into the underlying persistent memory index via the background thread.

12. The system of claim 11, wherein a persistent memory space of each NUMA node is stored with each partial persistent view, and the global volatile view in the DRAM is shared by the plurality of NUMA nodes.

13. The system of claim 11, wherein an access frequency of keys of the hot data is greater than a set threshold, and the access frequency of keys of the cold data is less than the set threshold.

14. The system of claim 11, wherein each partial persistent view is stored with a key-value pair corresponding to a piece of hot data and additional metadata having a 64-bit monotonically increasing version, in which the version is configured to restore the latest key-value pair among the partial persistent views after the system crashes and restarts.

15. The system of claim 14, wherein each partial persistent view is organized into an array, when the value for the piece of hot data is variable, each element of the array is a 64-bit pointer which points to {value, version} for the piece of hot data and a copy-on-write is employed to ensure crash consistency via the foreground thread.

16. The system of claim 14, wherein each partial persistent view is organized into an array, when the value for the piece of hot data is in a fixed length with 8 bytes, each element of the array comprises a 1-byte indicator pointing to a valid data location and two 16-byte tuples.

17. The system of claim 11, wherein the global volatile view is stored with the key-value pair corresponding to the piece of hot data, a readers-writer lock, and location information of the key-value pair in the partial persistent view, in which the readers-writer lock is configured to ensure the correctness of concurrent access.

18. The system of claim 17, wherein the underlying persistent memory index is configured to support the concurrent access and is stored in the persistent memory for the plurality of NUMA nodes.

19. The system of claim 11, wherein the query operation for the hot data comprises:
   querying the global volatile view to fetch a read lock of the key-value pair corresponding to the piece of hot data via the foreground thread,
   reading the key-value pair based on the read lock via the foreground thread, and
   releasing the read lock via the foreground thread.

20. The system of claim 11, wherein the insert, update or delete operation for the hot data comprises:
   querying the global volatile view to fetch a write lock of the key-value pair corresponding to the piece of hot data via the foreground thread,
   reading location information of the key-value pair in the partial persistent view via the foreground thread,
   writing the latest value into the local partial persistent view according to the location information via the foreground thread,
   updating the key-value pair in the global volatile view to the latest value via the foreground thread, and
   releasing the write lock via the foreground thread.

* * * * *